(12) United States Patent
Kraft et al.

(10) Patent No.: US 11,501,384 B2
(45) Date of Patent: Nov. 15, 2022

(54) SYSTEM FOR CAPTURING PASSENGER AND TRIP DATA FOR A VEHICLE

(71) Applicant: Allstate Insurance Company, Northbrook, IL (US)

(72) Inventors: Daniel Kraft, Libertyville, IL (US); Thomas Michael Warden, Belmont, CA (US); Eric Huls, Chicago, IL (US); Nathan M. Bryer, Arlington Heights, IL (US); Margaret A. Brinkmann, Palo Alto, CA (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/223,701

(22) Filed: Apr. 6, 2021

(65) Prior Publication Data

US 2021/0241379 A1    Aug. 5, 2021

Related U.S. Application Data

(63) Continuation of application No. 16/440,429, filed on Jun. 13, 2019, now Pat. No. 10,997,669, which is a
(Continued)

(51) Int. Cl.
*G06Q 40/08* (2012.01)
*G07C 5/08* (2006.01)
*G07C 5/00* (2006.01)

(52) U.S. Cl.
CPC ............ *G06Q 40/08* (2013.01); *G07C 5/008* (2013.01); *G07C 5/0816* (2013.01)

(58) Field of Classification Search
CPC ....... G06Q 40/08; G07C 5/008; G07C 5/0816
(Continued)

(56) References Cited

U.S. PATENT DOCUMENTS

| 5,467,388 A | 11/1995 | Redd, Jr. et al. |
| 5,499,182 A | 3/1996 | Ousborne |

(Continued)

FOREIGN PATENT DOCUMENTS

| EP | 0700009 A2 | 3/1996 |
| EP | 2937844 A1 | 10/2015 |

(Continued)

OTHER PUBLICATIONS

"Warn me now or inform me later: Drivers' acceptance of real-time and post-drive distraction mitigation systems" by Shannon C. Roberts; Mahtab Ghazizadeh; and John D. Lee. Int. J. Human-Computer Studies 70 (2012) pp. 967-979. (Year: 2012).*

(Continued)

*Primary Examiner* — Sara C Hamilton
(74) *Attorney, Agent, or Firm* — Polsinelli PC

(57) ABSTRACT

Telematics and external data relating to the real-time driving of a driver of a taxi vehicle may be collected and used to calculate a driving score. A telematics device installed in the taxi vehicle may collect vehicle data, trip data, and passenger data from one or more sensors. A computing device in communication with the telematics device may calculate a driving score for the taxi vehicle during a trip based on a type of vehicle, a type of trip, a number of miles driven during the trip, a duration of the trip, a number of passengers in the taxi vehicle during the trip, and a type of the passengers in the taxi vehicle during the trip. As one example, the driving score may be provided to an employer of a driver of the taxi vehicle.

20 Claims, 3 Drawing Sheets

Related U.S. Application Data continuation of application No. 15/160,208, filed on May 20, 2016, now Pat. No. 10,360,636, which is a continuation of application No. 13/564,524, filed on Aug. 1, 2012, now abandoned.

(58) Field of Classification Search
USPC .......................................................... 705/4
See application file for complete search history.

(56) References Cited

U.S. PATENT DOCUMENTS

| | | | |
|---|---|---|---|
| 5,619,568 | A | 4/1997 | Miller |
| 6,175,803 | B1 | 1/2001 | Chowanic et al. |
| 6,233,445 | B1 | 5/2001 | Boltz et al. |
| 6,351,698 | B1 | 2/2002 | Kubota et al. |
| 6,629,029 | B1 | 9/2003 | Giles |
| 6,868,386 | B1 | 3/2005 | Henderson et al. |
| 7,167,787 | B2 | 1/2007 | Bastian et al. |
| 7,292,152 | B2 | 11/2007 | Torkkola et al. |
| 7,356,516 | B2 | 4/2008 | Richey et al. |
| 7,535,344 | B2 | 5/2009 | Obradovich |
| 7,565,230 | B2 | 7/2009 | Gardner et al. |
| 7,657,441 | B2 | 2/2010 | Richey et al. |
| 7,659,827 | B2 | 2/2010 | Gunderson et al. |
| 7,742,792 | B2 | 6/2010 | Matsui |
| 8,090,598 | B2 | 1/2012 | Bauer et al. |
| 8,180,655 | B1 | 5/2012 | Hopkins, III |
| 8,270,933 | B2 | 9/2012 | Riemer et al. |
| 8,275,348 | B2 | 9/2012 | Yen et al. |
| 8,311,858 | B2 | 11/2012 | Everett et al. |
| 8,314,708 | B2 | 11/2012 | Gunderson et al. |
| 8,332,242 | B1 | 12/2012 | Medina, III |
| 8,355,818 | B2 | 1/2013 | Nielsen et al. |
| 8,489,433 | B2 | 7/2013 | Altieri et al. |
| 8,506,512 | B2 | 8/2013 | Aklog et al. |
| 8,508,353 | B2 | 8/2013 | Cook et al. |
| 8,538,687 | B2 | 9/2013 | Plocher et al. |
| 8,566,126 | B1 | 10/2013 | Hopkins, III |
| 8,606,512 | B1 | 12/2013 | Bogovich et al. |
| 8,612,139 | B2 | 12/2013 | Wang et al. |
| 8,620,575 | B2 | 12/2013 | Vogt et al. |
| 8,626,444 | B2 | 1/2014 | Li et al. |
| 8,655,965 | B2 | 2/2014 | McWithey et al. |
| 8,682,699 | B2 | 3/2014 | Collins et al. |
| 8,686,872 | B2 | 4/2014 | Szczerba et al. |
| 8,712,429 | B2 | 4/2014 | Nagorniak |
| 8,731,768 | B2 | 5/2014 | Fernandes et al. |
| 8,744,492 | B2 | 6/2014 | Kuo |
| 8,805,707 | B2 | 8/2014 | Schumann, Jr. et al. |
| 8,810,425 | B2 | 8/2014 | Hyde et al. |
| 8,818,618 | B2 * | 8/2014 | Follmer ................ G06Q 40/08 701/33.4 |
| 8,824,997 | B2 | 9/2014 | Gehlen et al. |
| 8,860,564 | B2 | 10/2014 | Rubin et al. |
| 8,930,229 | B2 | 1/2015 | Bowne et al. |
| 8,971,927 | B2 | 3/2015 | Zhou et al. |
| 8,996,234 | B1 | 3/2015 | Tamari et al. |
| 9,020,749 | B2 | 4/2015 | Aso et al. |
| 9,020,751 | B1 | 4/2015 | Bogovich et al. |
| 9,066,210 | B2 | 6/2015 | Kalita et al. |
| 9,082,072 | B1 | 7/2015 | Wedding, Jr. et al. |
| 9,104,535 | B1 | 8/2015 | Brinkmann et al. |
| 9,112,937 | B1 | 8/2015 | Warden et al. |
| 9,117,246 | B2 * | 8/2015 | McClellan ............. G07C 5/008 |
| 9,142,142 | B2 | 9/2015 | Nath et al. |
| 9,150,154 | B2 | 10/2015 | Miller et al. |
| 9,177,427 | B1 | 11/2015 | Briggs et al. |
| 9,207,675 | B1 | 12/2015 | Walser et al. |
| 9,317,980 | B2 | 4/2016 | Cook et al. |
| 9,519,670 | B2 | 12/2016 | Stanek et al. |
| 9,574,888 | B1 | 2/2017 | Hu et al. |
| 9,805,601 | B1 | 10/2017 | Fields et al. |
| 9,851,214 | B1 | 12/2017 | Chintakindi |
| 10,019,904 | B1 | 7/2018 | Chan |
| 10,360,636 | B1 | 7/2019 | Kraft et al. |
| 2002/0046064 | A1 | 4/2002 | Maury et al. |
| 2002/0059084 | A1 | 5/2002 | Wahlbin et al. |
| 2004/0210353 | A1 | 10/2004 | Rice |
| 2004/0214615 | A1 | 10/2004 | Entenmann et al. |
| 2005/0060069 | A1 | 3/2005 | Breed et al. |
| 2005/0086227 | A1 | 4/2005 | Sullivan et al. |
| 2006/0053038 | A1 | 3/2006 | Warren et al. |
| 2006/0200008 | A1 | 9/2006 | Moore-Ede |
| 2006/0247852 | A1 | 11/2006 | Kortge et al. |
| 2006/0253307 | A1 | 11/2006 | Warren et al. |
| 2007/0027726 | A1 | 2/2007 | Warren et al. |
| 2007/0080816 | A1 | 4/2007 | Haque et al. |
| 2007/0136107 | A1 | 6/2007 | Maguire et al. |
| 2007/0226014 | A1 | 9/2007 | Alemayehu et al. |
| 2007/0268158 | A1 | 11/2007 | Gunderson et al. |
| 2008/0016145 | A1 | 1/2008 | Takase et al. |
| 2008/0059351 | A1 | 3/2008 | Richey et al. |
| 2008/0065427 | A1 | 3/2008 | Helitzer et al. |
| 2008/0120175 | A1 | 5/2008 | Doering |
| 2008/0243321 | A1 | 10/2008 | Walser et al. |
| 2008/0243558 | A1 | 10/2008 | Gupte |
| 2008/0255722 | A1 | 10/2008 | McClellan et al. |
| 2008/0255888 | A1 | 10/2008 | Berkobin et al. |
| 2008/0262670 | A1 | 10/2008 | McClellan et al. |
| 2008/0270519 | A1 | 10/2008 | Ekdahl et al. |
| 2008/0294060 | A1 | 11/2008 | Haro et al. |
| 2008/0294690 | A1 * | 11/2008 | McClellan ............... G08G 1/20 |
| 2008/0319602 | A1 | 12/2008 | McClellan et al. |
| 2009/0024273 | A1 | 1/2009 | Follmer et al. |
| 2009/0024419 | A1 | 1/2009 | McClellan et al. |
| 2009/0079555 | A1 | 3/2009 | Aguirre De Carcer et al. |
| 2009/0132294 | A1 | 5/2009 | Haines |
| 2010/0030582 | A1 | 2/2010 | Rippel et al. |
| 2010/0030592 | A1 | 2/2010 | Evans et al. |
| 2010/0042314 | A1 | 2/2010 | Vogt et al. |
| 2010/0057358 | A1 | 3/2010 | Winer et al. |
| 2010/0063850 | A1 | 3/2010 | Daniel |
| 2010/0073124 | A1 * | 3/2010 | Mahalingaiah ........ G07C 5/006 340/5.1 |
| 2010/0087984 | A1 | 4/2010 | Joseph |
| 2010/0131303 | A1 | 5/2010 | Collopy et al. |
| 2010/0131304 | A1 | 5/2010 | Collopy et al. |
| 2010/0157061 | A1 | 6/2010 | Katsman et al. |
| 2010/0174566 | A1 | 7/2010 | Helitzer et al. |
| 2010/0205012 | A1 | 8/2010 | McClellan |
| 2010/0207787 | A1 * | 8/2010 | Catten ............. G08G 1/096716 340/905 |
| 2010/0211259 | A1 | 8/2010 | McClellan |
| 2010/0238009 | A1 | 9/2010 | Cook et al. |
| 2010/0250021 | A1 | 9/2010 | Cook et al. |
| 2010/0292886 | A1 | 11/2010 | Szczerba et al. |
| 2010/0323673 | A1 | 12/2010 | Etram et al. |
| 2011/0009107 | A1 | 1/2011 | Guba et al. |
| 2011/0039581 | A1 | 2/2011 | Cai et al. |
| 2011/0054716 | A1 | 3/2011 | Stahlin et al. |
| 2011/0090221 | A1 | 4/2011 | Ren |
| 2011/0092159 | A1 | 4/2011 | Park et al. |
| 2011/0106370 | A1 | 5/2011 | Duddle et al. |
| 2011/0144909 | A1 | 6/2011 | Ren et al. |
| 2011/0161116 | A1 | 6/2011 | Peak et al. |
| 2011/0196571 | A1 | 8/2011 | Foladare et al. |
| 2011/0205043 | A1 | 8/2011 | Fujiki et al. |
| 2011/0213628 | A1 | 9/2011 | Peak et al. |
| 2011/0219080 | A1 | 9/2011 | McWithey et al. |
| 2011/0231055 | A1 * | 9/2011 | Knight ................. G07C 5/008 701/1 |
| 2011/0269441 | A1 | 11/2011 | Silver |
| 2011/0301997 | A1 * | 12/2011 | Gale ................. G06Q 10/1097 705/7.26 |
| 2011/0320492 | A1 | 12/2011 | Inghelbrecht |
| 2012/0004933 | A1 | 1/2012 | Foladare et al. |
| 2012/0010906 | A1 | 1/2012 | Foladare et al. |
| 2012/0021386 | A1 | 1/2012 | Anderson et al. |
| 2012/0072243 | A1 | 3/2012 | Collins et al. |
| 2012/0072244 | A1 | 3/2012 | Collins et al. |
| 2012/0083287 | A1 | 4/2012 | Casto et al. |
| 2012/0089423 | A1 | 4/2012 | Tamir et al. |
| 2012/0095646 | A1 | 4/2012 | Ghazarian |
| 2012/0101855 | A1 | 4/2012 | Collins et al. |

(56) References Cited

U.S. PATENT DOCUMENTS

| | | | |
|---|---|---|---|
| 2012/0109692 A1 | 5/2012 | Collins et al. | |
| 2012/0123806 A1 | 5/2012 | Schumann, Jr. et al. | |
| 2012/0166229 A1 | 6/2012 | Collins et al. | |
| 2012/0197669 A1 | 8/2012 | Kote et al. | |
| 2012/0209632 A1 | 8/2012 | Kaminski et al. | |
| 2012/0226421 A1 | 9/2012 | Kote et al. | |
| 2012/0239462 A1* | 9/2012 | Pursell | G07C 5/085 701/123 |
| 2012/0246192 A1 | 9/2012 | Kenyon | |
| 2012/0253586 A1 | 10/2012 | Sakakibara | |
| 2012/0289214 A1 | 11/2012 | Hynes et al. | |
| 2012/0303392 A1 | 11/2012 | Depura et al. | |
| 2012/0311416 A1 | 12/2012 | Richter et al. | |
| 2012/0316933 A1 | 12/2012 | Pentland et al. | |
| 2013/0006674 A1 | 1/2013 | Bowne et al. | |
| 2013/0006675 A1 | 1/2013 | Bowne et al. | |
| 2013/0006715 A1 | 1/2013 | Warkentin et al. | |
| 2013/0024060 A1 | 1/2013 | Sukkarie et al. | |
| 2013/0046559 A1 | 2/2013 | Coleman et al. | |
| 2013/0060583 A1* | 3/2013 | Collins | G06Q 40/08 705/4 |
| 2013/0073112 A1* | 3/2013 | Phelan | G07C 5/02 701/1 |
| 2013/0073321 A1 | 3/2013 | Hofmann et al. | |
| 2013/0078963 A1 | 3/2013 | Prasad et al. | |
| 2013/0090803 A1 | 4/2013 | Stahlin et al. | |
| 2013/0110310 A1 | 5/2013 | Young | |
| 2013/0124082 A1 | 5/2013 | Cho | |
| 2013/0137404 A1 | 5/2013 | Kuo | |
| 2013/0138460 A1* | 5/2013 | Schumann, Jr. | G06Q 50/30 705/4 |
| 2013/0141249 A1* | 6/2013 | Pearlman | G09B 19/14 340/870.03 |
| 2013/0151288 A1 | 6/2013 | Bowne et al. | |
| 2013/0157640 A1 | 6/2013 | Aycock | |
| 2013/0166325 A1 | 6/2013 | Ganapathy et al. | |
| 2013/0217331 A1 | 8/2013 | Manente | |
| 2013/0238233 A1 | 9/2013 | Kim et al. | |
| 2013/0297097 A1 | 11/2013 | Fischer et al. | |
| 2013/0304514 A1 | 11/2013 | Hyde et al. | |
| 2013/0304515 A1* | 11/2013 | Gryan | G06Q 40/08 705/4 |
| 2013/0317736 A1 | 11/2013 | Fernandes et al. | |
| 2013/0344856 A1 | 12/2013 | Silver et al. | |
| 2014/0019170 A1 | 1/2014 | Coleman et al. | |
| 2014/0067434 A1 | 3/2014 | Bourne et al. | |
| 2014/0074402 A1 | 3/2014 | Hassib et al. | |
| 2014/0080100 A1 | 3/2014 | Phelan et al. | |
| 2014/0167946 A1 | 6/2014 | Armitage et al. | |
| 2014/0180723 A1 | 6/2014 | Cote et al. | |
| 2014/0207497 A1 | 7/2014 | Collins et al. | |
| 2014/0222280 A1 | 8/2014 | Salomonsson et al. | |
| 2014/0226010 A1 | 8/2014 | Molin et al. | |
| 2014/0257869 A1 | 9/2014 | Binion et al. | |
| 2014/0257871 A1 | 9/2014 | Christensen et al. | |
| 2014/0267263 A1 | 9/2014 | Beckwith et al. | |
| 2014/0267627 A1 | 9/2014 | Freeman et al. | |
| 2014/0268353 A1 | 9/2014 | Fujimura et al. | |
| 2014/0277939 A1 | 9/2014 | Ren et al. | |
| 2014/0278574 A1 | 9/2014 | Barber | |
| 2014/0322676 A1 | 10/2014 | Raman | |
| 2014/0336866 A1 | 11/2014 | Kloeden et al. | |
| 2014/0350970 A1 | 11/2014 | Schumann, Jr. et al. | |
| 2014/0358840 A1 | 12/2014 | Tadic et al. | |
| 2015/0006207 A1 | 1/2015 | Jarvis et al. | |
| 2015/0056973 A1 | 2/2015 | Efrati | |
| 2015/0066360 A1 | 3/2015 | Kirsch | |
| 2015/0112545 A1 | 4/2015 | Binion et al. | |
| 2015/0112730 A1 | 4/2015 | Binion et al. | |
| 2015/0112800 A1 | 4/2015 | Binion et al. | |
| 2015/0172450 A1 | 6/2015 | Singhal | |
| 2015/0187016 A1 | 7/2015 | Adams et al. | |
| 2015/0187019 A1 | 7/2015 | Fernandes et al. | |
| 2015/0241226 A1 | 8/2015 | Engelman et al. | |
| 2016/0039426 A1 | 2/2016 | Ricci | |
| 2016/0047666 A1 | 2/2016 | Fuchs | |
| 2016/0050315 A1 | 2/2016 | Malhotra et al. | |
| 2016/0073240 A1 | 3/2016 | Helm | |
| 2016/0134744 A1 | 5/2016 | de la Fuente Sanchez | |
| 2016/0182707 A1 | 6/2016 | Gabel | |
| 2016/0231278 A1 | 8/2016 | Goroshevskiy et al. | |
| 2017/0122989 A1 | 5/2017 | Ho | |
| 2018/0158334 A1 | 6/2018 | Perez Barrera et al. | |
| 2018/0162410 A1 | 6/2018 | Skillsater et al. | |
| 2018/0362026 A1 | 12/2018 | Heimberger et al. | |

FOREIGN PATENT DOCUMENTS

| | | |
|---|---|---|
| JP | 2015169472 A | 9/2015 |
| WO | 2007008924 A2 | 1/2007 |
| WO | 2008001125 A1 | 1/2008 |
| WO | 2010011806 A1 | 1/2010 |
| WO | 2011004372 A1 | 1/2011 |

OTHER PUBLICATIONS

"Autonomous Cars from Berlin" website: http://autonomos-labs.com/research/ website last visited on Apr. 30, 2015.

"Axeda and Walsh Vision Announce Alliance for Cloud Telematics Solutions" retrieved Sep. 6, 2011 from http://www.cbs19.tv/story/15234817/axeda-and-walsh-vision-announce-alliance-for-cloud-telematics-solutions pp. 1-4.

"Continental Head-up Display Augmented Reality HUD" http://continental-head-up-display.com/ website last visited on Apr. 30, 2015.

"Drive Control—For When you Need a Little More Self Control," retrieved Apr. 8, 2016 from https://drivecontrolapp.com, 2 pages.

"In the Future, Your Car's Windscreen Will Be an Augmented Reality Display" https://transportevolved.com/2014/09/29/future-cars-windscreen-will-augmented-reality-display/ website last visited on Apr. 30, 2015.

"Road Asset Management", https://www.arrb.com/au/Infrastructure/Road-asset-management.aspx, Last visited Oct. 8, 2015, pp. 1-5.

"Telematics: Reinventing Auto Insurance," retrieved Sep. 6, 2011 from http://www.insurancetech.com/blog/archives/2010/03/telematics_the.html, 10 pages.

Jun. 2, 2011—"Drivers have an IQ, EQ and now with car insurance also a DQ" http://www.insurancechat.co.za/2011-06/drivers-have-an-iq-eq-and-now-with-car-insurance-also-a-dq/.

Oct. 8, 2013—U.S. Non-Final Office Action—U.S. Appl. No. 13/564,524.

Feb. 4, 2014—U.S. Final Office Action—U.S. Appl. No. 13/564,524.

Jul. 13, 2015 U.S. Non-Final Office Action—U.S. Appl. No. 14/066,988.

Jul. 20, 2015—U.S. Non-Final Office Action—U.S. Appl. No. 13/564,524.

Nov. 23, 2015—U.S. Final Office Action—U.S. Appl. No. 13/564,524.

Nov. 23, 2015—U.S. Final Office Action—U.S. Appl. No. 14/066,988.

Sep. 30, 2015—U.S. Non-Final Office Action—U.S. Appl. No. 14/227,740.

2016—"Driver Safety Quotient" http://www.geninfo.com/assessments/driver-safety-quotient.asp.

Dec. 5, 2016 (WO)—International Search Report and Written Opinion—App. PCT/US2016/052877.

Jun. 10, 2016 U.S. Non-Final Office Action—U.S. Appl. No. 14/066,988.

Mar. 23, 2016—U.S. Final Office Action—U.S. Appl. No. 14/227,740.

Mar. 28, 2016—U.S. Non-Final Office Action—U.S. Appl. No. 13/564,524.

Nov. 22, 2016—U.S. Final Office Action—U.S. Appl. No. 14/066,988.

Sep. 1, 2016—U.S. Final Office Action—U.S. Appl. No. 13/564,524.

Apr. 18, 2017—(WO) International Search Report—PCT/IN2016/050355.

Aug. 9, 2017—U.S. Final Office Action—U.S. Appl. No. 15/284,801.

Feb. 2, 2017—(WO) International Search Report—App PCT/US2016/063527.

Jan. 31, 2017—U.S. Non-Final Office Action—U.S. Appl. No. 14/227,740.

(56) References Cited

OTHER PUBLICATIONS

Jun. 23, 2017—U.S. Non-Final Office Action—U.S. Appl. No. 15/284,728.
Jun. 6, 2017—U.S. Non-Final Office Action—U.S. Appl. No. 13/564,524.
Jun. 7, 2017—U.S. Final Office Action—U.S. Appl. No. 14/227,740.
Mar. 3, 2017—U.S. Non-Final Office Action—U.S. Appl. No. 15/284,801.
May 19, 2017 (WO) International Search Report and Written Opinion—App. PCT/IN2016/050370.
May 24, 2017—(WO) International Search Report and Written Opinion—PCT/IN16/50369.
Nov. 16, 2017—U.S. Non-Final Office Action—U.S. Appl. No. 14/863,476.
Nov. 22, 2017—U.S. Notice of Allowance—U.S. Appl. No. 15/284,728.
Sep. 12, 2017—U.S. Final Office Action—U.S. Appl. No. 13/564,524.
Sep. 13, 2017—U.S. Non-Final Office Action—U.S. Appl. No. 14/066,988.
Aug. 3, 2018—U.S. Final Office Action—U.S. Appl. No. 14/863,476.
Dec. 5, 2018—U.S. Notice of Allowance—U.S. Appl. No. 15/284,728.
Feb. 26, 2018—U.S. Non-Final Office Action—U.S. Appl. No. 14/227,740.
Jan. 24, 2018—U.S. Notice of Allowance—U.S. Appl. No. 15/284,801.
Jun. 29, 2018—U.S. Non-Final Office Action—U.S. Appl. No. 15/959,527.
Mar. 1, 2018—U.S. Non-Final Office Action—U.S. Appl. No. 15/284,728.
Mar. 20, 2018—U.S. Non-Final Office Action—U.S. Appl. No. 15/052,291.
Nov. 2, 2018—U.S. Non-Final Office Action—U.S. Appl. No. 15/160,208.
Nov. 28, 2018—U.S. Non-Final Office Action—U.S. Appl. No. 15/268,750.
Nov. 29, 2018—U.S. Notice of Allowance—U.S. Appl. No. 15/959,527.
Oct. 17, 2018 U.S. Final Office Action—U.S. Appl. No. 15/052,291.
Sep. 4, 2018—U.S. Notice of Allowance—U.S. Appl. No. 15/284,728.
Apr. 2, 2019—U.S. Non-Final Office Action—U.S. Appl. No. 15/052,291.
Chalon Smith, Mark—Pay-As-You-Drive Discounts: A Guide, http://www.insurance.com/auto-insurance/saving-money/low-mileage-discounts-guide.html, Apr. 22, 2015, Insurance.com.
Dewri, Rinku et al—Inferring Trip Destinations From Driving Habits Data, http://www.cs.du.edu/~rdewri/data/MyPapers/Conferences/2013WPES-Extended.pdf, Last Visited Feb. 25, 2016.
How's My Driving?—http://www.economist.com/news/finance-and-economics/21572237-gizmos-track-driving-habits-are-changing-face-car-insurance-hows-my—Feb. 23, 2013—Print Edition of The Economist.
Insurance Companies Utilizing Technology Fairbault Daily News, May 10, 2011, http://www.fairbault.com/print/11435 pp. 1-3.
Li, Z et al.: "Road Risk Modeling and Cloud-Aided Safety-Based Route Planning", Published in Cybernetics, IEEE Translations dated Oct. 2, 2015, pp. 1-2.
Martin Demers, "Waste Fleet Safety: Influencing Driver Behavior" 2010 Waste Management Magazine, pp. 1-3.
Rafter, Michelle—Use-Based Insurance Shifts Into High Gear, http://www.edmunds.com/auto-insurance/pay-as-you-drive-insurance-goes-into-high-gear.html, Feb. 27, 2014, Edmunds.
Rosolino, V. et al: "Road Safety Performance Assessment: A New Road Network Risk Index for Info Mobility", ScienceDirect: Procedia—Social and Behavioral Sciences 111 (2014) pp. 624-633.
Shabeer, et al., "Mobile Communication Safety on Road Transport," WSEAS Transactions on Communications, ISSN: 2224-2864, Issue 3, vol. 12, Mar. 2013, 12 pages.
Usage-Based Insurance and Telematics, http://www.naic.org/cipr_topics/topic_usage_based_insurance.htm, Last Updated Dec. 14, 2015—National Association of Insurance Commissioners & The Center for Insurance Policy and Research.
Williams, Geoff—Should You Try Pay-As-You-Drive Insurance?, Jan. 13, 2014, http://money.usnews.com/money/personal-finance/articles/2014/01/13/should-you-try-pay-as-you-drive-insurance, U.S. News & World Report.
Apr. 12, 2019—U.S. Final Office Action—U.S. Appl. No. 15/268,750.
Apr. 17, 2019—U.S. Notice of Allowance—U.S. Appl. No. 15/160,208.
"Usage-Based Auto Insurance (UBI): A Revolution Is Underway. Is Your Company Ready?", Robin Harbage, FCAS, MAAA, published Dec. 2011, Copyright Towers Watson (hereinafter Harbage), Year 2011.
May 27, 2019—(EP) Extended Supplemental Search Report—EP Application No. 16849502.6.
"Junior: The Stanford Entry in the Urban Challenge", Michael Montemerlo et al., Journal of Field Robotics, vol. 25, No. 9, Sep. 1, 2008, pp. 569-597, XP055169616.
"Moving Object Detection with Laser Scanners", Christoph Mertz et al., Journal of Field Robotics, vol. 30, No. 1, Jul. 3, 2012, pp. 17-43, XP055460334.
May 31, 2019 U.S. Non-Final Office Action—U.S. Appl. No. 14/863,476.
Jun. 13, 2019—(CA) Office Action—Application No. 3,015,235.
Sep. 6, 2019—(EP) Extended Search Report—Application No. 16891883.7.
Oct. 2, 2019—U.S. Non-Final Office Action—U.S. Appl. No. 15/268,750.
Nov. 13, 2019—U.S. Final Office Action—U.S. Appl. No. 15/052,291.
Nov. 8, 2019—(IN) Examination Report—Application No. 201644035721.
Nov. 14, 2014—U.S. Non-Final Office Action—U.S. Appl. No. 16/287,022.
Sep. 30, 2019—(CA) Notice of Allowance—Application No. 2,999,498.
Dec. 19, 2019—(IN) Office Action—Application No. 201644037045.
Dec. 23, 2019—U.S. Notice of Allowance—U.S. Appl. No. 15/268,750.
Feb. 7, 2020—U.S. Final Office Action—U.S. Appl. No. 14/863,476.
Mar. 2, 2020—(EP) Partial Search Report—App. No. EP16918214.
Mar. 18, 2020—(EP) Partial Search Report—App. No. EP16918215.
Mar. 27, 2020—U.S. Non-Final Office Action—U.S. Appl. No. 15/052,291.
Apr. 22, 2020—U.S. Non-Final Office Action—U.S. Appl. No. 15/295,317.
May 14, 2020—U.S. Notice of Allowance—U.S. Appl. No. 15/268,750.
Jun. 23, 2020—(EP) Extended Search Report—App. No. EP16918214.
Jul. 13, 2020—(EP) Office Action—App. No. 16891883.7.
Jul. 28, 2020—U.S. Notice of Allowance—U.S. Appl. No. 16/287,022.
Jul. 22, 2020—(CA) Office Action—App. No. 3015235.
Aug. 24, 2020—(EP) Examination Report—App. No. 16849502.6.
Aug. 18, 2020—(IN) Examination Report—App. No. 201817034104.
Sep. 8, 2020—U.S. Non-Final Office Action—U.S. Appl. No. 16/440,429.
Sep. 23, 2020—U.S. Final Office Action—U.S. Appl. No. 15/052,291.
Oct. 1, 2020—U.S. Final Office Action—U.S. Appl. No. 15/295,317.
Oct. 15, 2020—U.S. Non-Final Office Action—U.S. Appl. No. 16/905,215.
Nov. 20, 2020—U.S. Notice of Allowance—U.S. Appl. No. 14/863,476.
Jan. 15, 2021—U.S. Notice of Allowance—U.S. Appl. No. 16/440,429.
"Warn me now or inform me later: Drivers' acceptance of real-time and post-drive distraction mitigation systems," by Shannon C. Roberts, Mahtab Ghazizadeh and John D. Lee, International Journal of Human-Computer Studies 70 (2012), Available online at www.sciencedirect.com (Year: 2012).
Mar. 12, 2021—U.S. Non-Final Office Action—U.S. Appl. No. 15/295,317.
Sun, et al., "Context-aware smart car: from model to prototype", Journal of Zhejiang University—Science A 10, 1049-1059(2009) (Year: 2009).

* cited by examiner

SYSTEM FOR CAPTURING PASSENGER AND TRIP DATA FOR A VEHICLE

CROSS-REFERENCE TO RELATED APPLICATIONS

This application is a continuation of U.S. patent application Ser. No. 16/440,429, filed Jun. 13, 2019, which is a continuation of U.S. patent application Ser. No. 15/160,208 which is a continuation of U.S. patent application Ser. No. 13/564,524, entitled "Calculation and Utilization of a Driving Score," filed Aug. 1, 2012, the disclosure of which is incorporated herein by reference.

TECHNICAL FIELD

Aspects of the disclosure generally relate to the calculation and utilization of a driving score. In particular, various aspects of the disclosure include a framework for using telematics to calculate and utilize a driving score.

BACKGROUND

Telematics may be described as use of technology to communicate information from one location to another. Telematics has been used for various applications, including for the exchange of information with electronic sensors. As telematics technology has progressed, various communication methodologies have been incorporated into automobiles and other types of vehicles.

One example of telematics systems currently in use in automobiles are on-board diagnostics (OBD) systems. From early versions of OBD systems that included crude implementations of control for features such as fuel injection to more sophisticated and standardized OBD-I and OBD-II units, these units have served as an electronic gateway into the health of a vehicle. These systems have allowed users to monitor a wide variety of engine sensors and systems, including emissions control, coolant temperature, engine RPM, vehicle speed, timing advance, throttle position, and oxygen sensing, among other things. Moreover, handheld units, mobile devices, personal computers, data loggers, and other devices may be connected to the OBD systems to serve as the interface for displaying data outputted by the OBD system. Data obtained from OBD systems has been used for a variety of purposes, including maintenance, diagnosis, and analysis.

SUMMARY OF THE INVENTION

Aspects of the disclosure relate to methods and systems for calculating and utilizing a driving score. In at least one embodiment, a plurality of real-time driving data or inputs is captured by a telematics device. The real-time driving inputs may include one or more of one or more of speed, acceleration, braking, steering, user of turn signals, user of seat belts, use of radio, use of a phone, location, miles driven, type of trip, engine status, oil level, tire pressure, number of passengers, and lane departures. One or more driving conditions may be received. The driving conditions may be one or more of weather, road conditions, type of road, and time of day. A processor may calculate the driving score. The driving score may be based at least in part on the plurality of real-time driving inputs and the one or more driving conditions. The calculated driving score may be sent to one or more devices or entities, such as a portable device.

In at least one embodiment, the driving score is validated by a validating agency. The validated driving score may be sent to one or more third parties. The third parties may be one or more of a financial institution, an insurance company, a credit agency, a department of motor vehicles. The third party may utilize the driving score in aspects of its business. The driving score may be sent to and stored on a device. The device may be a computing device or may be a portable device, such as a key fob or a mobile telephone.

In at least one embodiment, the driving score is displayed to the driver. The driving score may be displayed on a device belonging to the driver, such as a key fob or a mobile telephone. Alternatively, the driving score may be displayed on an item within a vehicle, such as a windshield or rearview mirror. The driving score may be a numerical, alphabetical, or graphical value.

In at least one embodiment, a driving report is generated. The driving report may be sent to one or more individuals and/or entities. For example, the driving report may be sent to an insurance company or the driver. The driving report may contain information relating to the real-time driving inputs collected and the driving conditions received. The driving report may also include information relating to the driving score and the habits of the driver. The driving report may also include recommendations relating to the driver's habits and or the effects of the driver's habits.

BRIEF DESCRIPTION OF THE DRAWINGS

The present disclosure is illustrated by way of example and is not limited in the accompanying figures in which.

DETAILED DESCRIPTION OF THE INVENTION

Aspects of the disclosure relate to methods, computer readable media, and apparatuses for using telematics data and external data to calculate and utilize a driving score for a driver of a vehicle.

Figure 1:
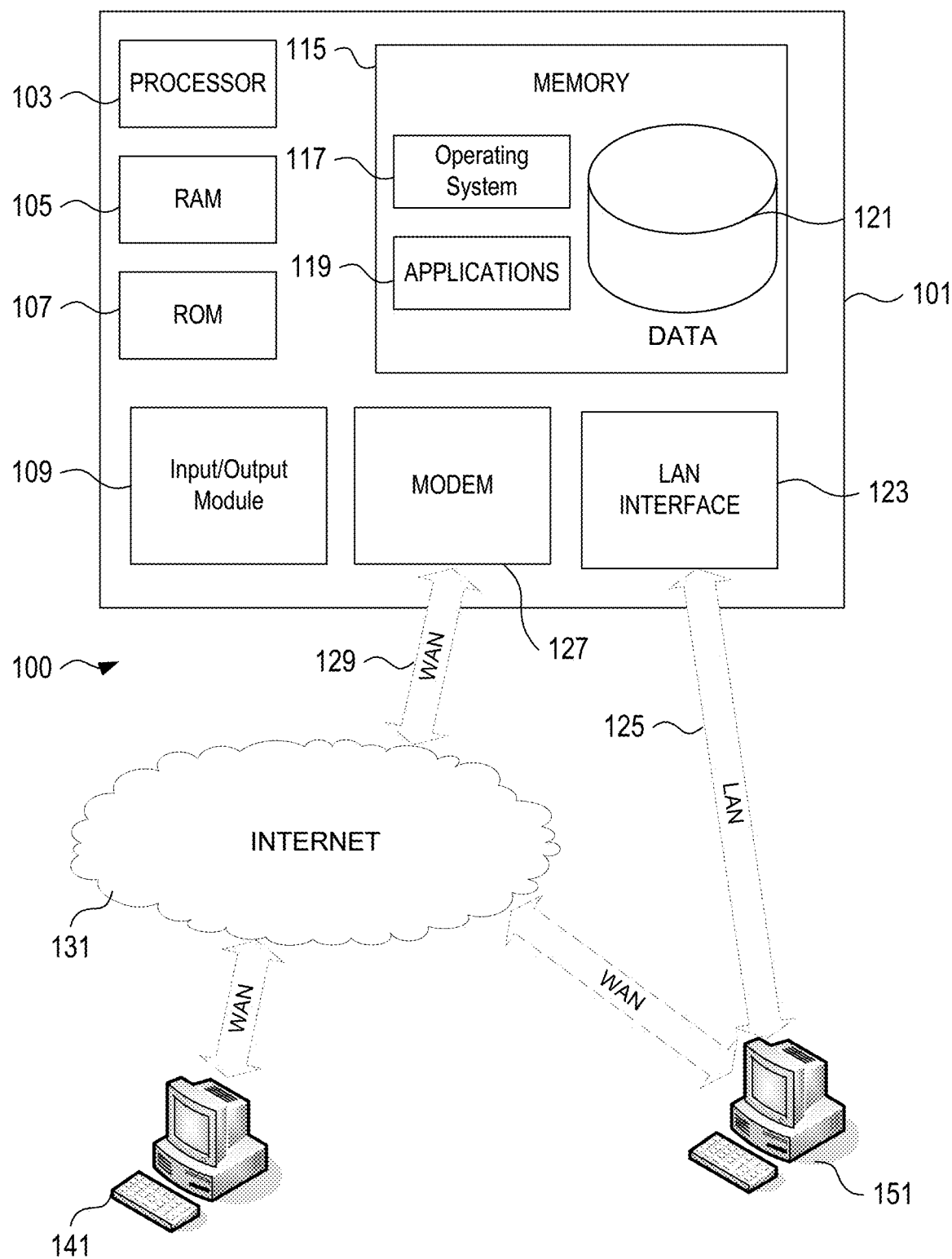
FIG. 1 shows a system involving an illustrative device through which various aspects of the disclosure may be implemented.

FIG. 1 illustrates a block diagram of a telematics device 101 (e.g., a computing device) in communication system 100 that may be used according to an illustrative embodiment of the disclosure. The device 101 may have a processor 103 for controlling overall operation of the telematics device 101 and its associated components, including RAM 105, ROM 107, input/output module 109, and memory 115. In certain embodiments, device 101 physically resides in an item (e.g., a vehicle, a mobile telephone, etc.) and receives information from sensors or other measurement devices incorporated into the item, and in other embodiments, device 101 may communicate from a remote location to sensors within an item.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated database 121. Processor 103 and its associated components may allow the device 101 to run a series of computer-readable instructions to read, store, and analyze various details about an item's operating parameters. For instance, the device 101 may capture data related to the real-time driving data of a driver of a vehicle. The device 101 may capture information related multiple parameters simultaneously and/or in real-time.

The device 101 may operate in a networked environment supporting connections to one or more remote computers, such as terminals 141 and 151. The terminals 141 and 151 may be personal computers or servers that include many or all of the elements described above relative to the device 101. Alternatively, terminal 141 and/or 151 may be storage servers for storing data associated with device 101. The network connections depicted in FIG. 1 includes a local area network (LAN) 125 and a wide area network (WAN) 129, but may also include other networks. When used in a LAN networking environment, the device 101 is connected to the LAN 125 through a network interface or adapter 123. When used in a WAN networking environment, the device 101 may include a modem 127 or other means for establishing communications over the WAN 129, such as the Internet 131. It will be appreciated that the network connections shown are illustrative and other means of establishing a communications link between the computers may be used. For example, the device 101 may communicate wirelessly with other computing systems and receivers. The existence of any of various well-known protocols such as TCP/IP, Ethernet, FTP, HTTP and the like is presumed.

Additionally, an application program 119 used by device 101 according to an illustrative embodiment of the disclosure may include computer executable instructions for invoking functionality related to capturing data associated with an item's operational state through sensors present on or around the item, processing this data, and/or storing the data locally and/or remotely. Device 101 and/or terminals 141 or 151 may also be mobile terminals including various other components, such as a battery, speaker, and antennas (not shown).

The disclosure is operational with numerous other general purpose and/or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable user electronics, network PCs, minicomputers, mainframe computers, mobile telephones, smart phones, and distributed computing environments that include any of the above systems or devices, and the like.

Aspects of the disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
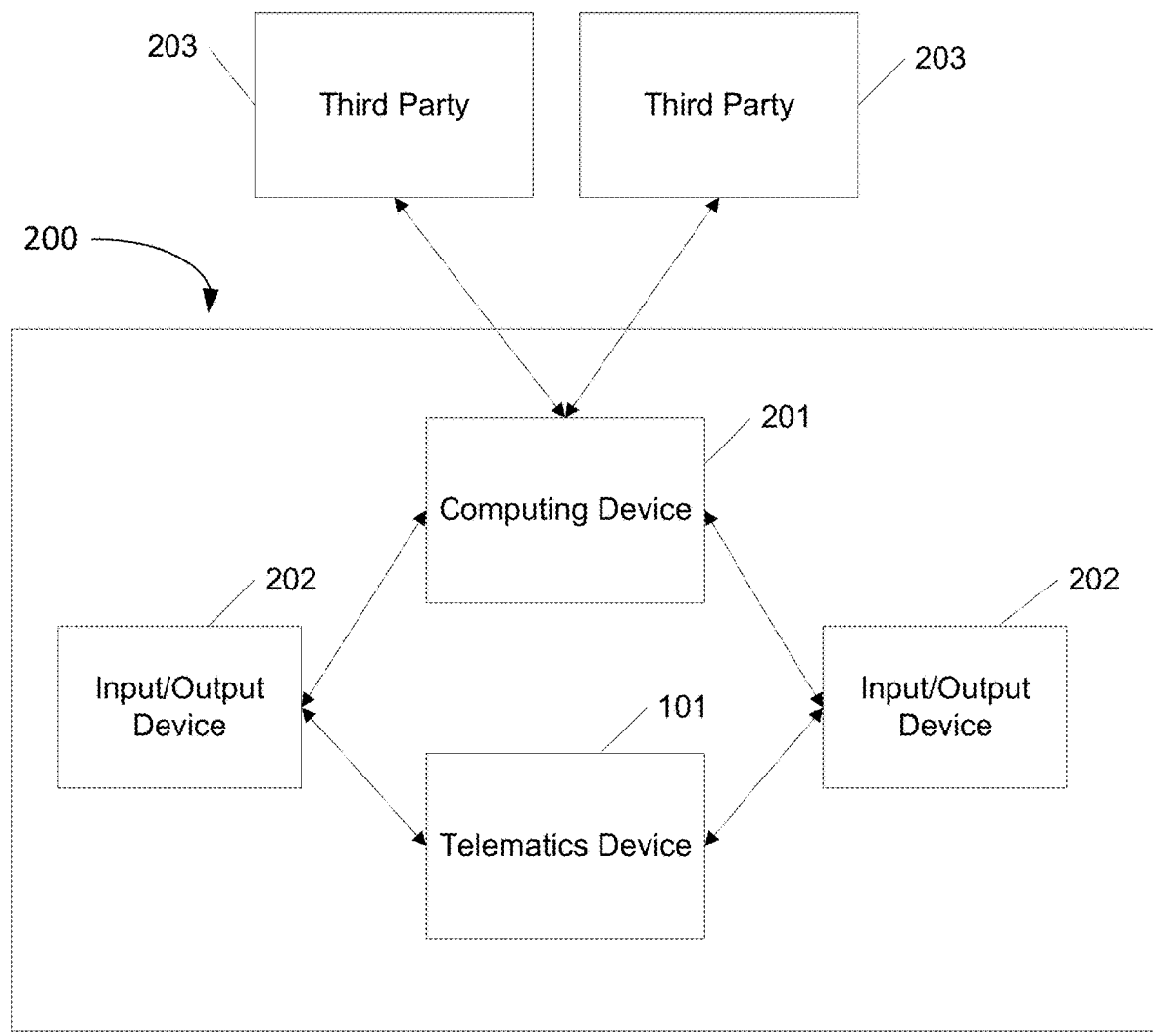
FIG. 2 is an illustrative block diagram of a system that may be used to implement the processes and functions of certain aspects of the present disclosure.

Referring to FIG. 2, an illustrative system 200 for implementing methods according to the present disclosure is shown. As illustrated, system 200 may include a telematics device 101, a computing device 201, and one or more input/output devices 202. Computing device 201 may be a computing device for processing data generated by telematics device 101 and calculating a driving score based on the processed data. Computing device 101 may receive data from a variety of input/output devices 202, including vehicle telematics data, smartphone telematics data, data from service providers, and/or demographic/descriptive data from third parties 203. Computing device 201 may reside either remotely or local to an item in which device 101 resides. If computing device 201 resides local to the item along with telematics device 101, computing device 201 may be integrated with telematics device 101.

Computing device 201 may possess many of the same hardware/software components as telematics device 101 shown in FIG. 1. For instance, the computing device 201 may be used by a program manager and/or insurance provider associated with the item which accompanies telematics device 101 to apply various business logic rules for determining a driving score for one or more drivers. The program manager may be a separate entity that may oversee implementation and validation of a driving score program. Alternatively, the program manager may be one of the service providers already involved in the driving score program, including an insurance provider, original equipment manufacturer (OEM), maintenance provider, or other service provider. The program manager may be an entity that enables data exchange and transaction processing between all parties involved in a driving score program.

The telematics device 101 may capture or receive any type of data relating to real-time driving. For example, the telematics device 101 may collect data relating to the driver's speed, acceleration of a vehicle, braking of a vehicle and/or anti-lock braking system application, and/or steering of a vehicle. The telematics device 101 may collect data relating to the vehicle, such as airbag deployment, anti-theft system disablement, use of headlights, whether the back-up lights turn on, whether the brake lights are on, door opening, door locking, use of cruise control, use of hazard lights, use of wipers, horn application, whether turn signals are used, whether seat belts are worn, whether a driver plays the radio, and/or talks on a telephone. The telematics device 101 may also capture data relating to the observance of traffic signals and signs. The telematics device 101 may also collect data relating to other vehicles, such as the presence and distance of vehicles on the side, front or back of the vehicle being monitored.

Additionally, the telematics device 101 may capture data relating to vehicle maintenance, such as the engine status, oil level, engine coolant temperature, odometer reading, the level of fuel in a tank, engine revolutions per minute (RPM), and/or tire pressure. The type of vehicle driven may also be recorded. The type of vehicle driven may be determined from the vehicle itself or by accessing data from an entity, such as an insurance policy. If a driver has more than one vehicle available to drive, the choice of vehicle may be collected. The choice of vehicle may be determined by accessing data that lists the available vehicles, such as an insurance policy, and/or data from the vehicle itself.

The telematics device 101 may be configured to collect data regarding the passengers of the vehicle. For example, the number of passengers or types of passengers (e.g. adults, children, teenagers, pets, etc.) may be collected. The driver's route choice, whether the driver follows a given route, type of trip (e.g. commute, errand, new route, etc.) or whether the driver stays within the lane may be collected. In at least one embodiment, the telematics device 101 is configured to communicate with sensors and/or one or more cameras in a vehicle that determine whether the vehicle stays within a lane or strays into other lanes. The telematics device 101 may be configured to collect data from a vehicle when the vehicle prevents the driver from performing an action (e.g. changing lanes when a car is in a new lane, speeding, etc.)

The telematics device 101 may also be configured to collect data relating to a driver's movements or the condition of a driver. For example, the telematics device 101 may include or communicate with sensors that monitor a driver's movements, such as the driver's eye position and/or head position, etc. Additionally, the telematics device 101 may collect the condition of a driver, such as fatigue or intoxication. The condition of the driver may be determined through the movements of the driver or through sensors, for example, sensors that detect the content of alcohol in the air or blood alcohol content of the driver, such as a breathalyzer.

The telematics device 101 may collect or receive the real-time data from any type of input or output device 202. For example, the telematics device 101 may receive data from a mobile telephone, a Global Positioning System (GPS), sensors positioned inside a vehicle, or sensors or devices remote from the vehicle. The sensors may include any type of sensors, such as body sensors and electrical sensors. The telematics device 101 may also be configured to send the data or driving score to one or more output devices 202. For example, the telematics device 101 may send the driving score to a mobile telephone or a key fob. Additionally or alternatively, the telematics device 101 may be configured to display the driving score within the vehicle. For example, the telematics device 101 may project the score on a vehicle's windshield or on the rear view mirror.

The driving score may be stored by the computing device 201 or may be sent to a separate processor or server for storing. Alternatively, the driving score may be stored in the memory of an input/output device 202, such as a key fob or a mobile telephone. In at least one embodiment, the driving score may be stored in a portable device and transferred from the portable device to another device. For example, the driving score may be stored in a driver's mobile telephone and transferred to a device, such as a computer, at the department of motor vehicles.

In at least one embodiment, the telematics device 101 can determine the driver of the vehicle. The driver may be determined by any suitable means. For example, the driving behavior of the driver may determine the driver, each driver may have a specific key fob to start the vehicle, or sensors within the telematics device 101 or vehicle may determine the driver. This may be done in any suitable manner. For example, the weight of the driver may be sensed. The telematics device 101 may also identify the driver through voice recognition, codes, fingerprint or retinal recognition, etc.

The telematics device 101 or computing device 201 may also capture or receive external data such as the location of the vehicle, weather, the traffic, the type of road, barometric pressure, and/or the time of day the vehicle is being driven. The external data may be collected from components within a vehicle or received from a third party 203. The number of miles driven, number of miles driven at certain times of the day, the number of miles per trip, the duration of the trip, the number of trips over a certain time, such as a day, month, or week, and/or the time of day the vehicle is driven may also be collected and/or received. In at least one embodiment, the driver's score may be generated and assigned to an autonomous car based on the autonomous car's driving performance.

The computing device 201 may calculate the driving score in any suitable manner. For example, the computing device 201 may apply weights to any of the collected or received data described above. The driving score may take into account data relating to the driver. For example, the driving score may take into account the driver's age, the driver's medical history and/or the driver's vision. The driving score may increase or decrease based on the real-time data collected by the telematics device 101 and the external data received. For example, if a driver consistently abides by the posted speed limits, wears a seatbelt, and keeps the vehicle in good repair, the driver's score may be increased. Alternatively, if the driver regularly speeds, does not repair the vehicle, and regularly brakes hard, the driver's score may be negatively affected.

The driving score may be any type of value, such as a numerical or alphabetical value. For example, the driving score may be a number between 0 and 800, similar to a credit score, or a score between 0 and 1.0, a letter grade, such as A, B, C, D, or F, with plus/minus gradients.

In at least one embodiment, a validating agency may validate the driving score calculated by the computing device 201. The driving score may be validated by verifying the accuracy of the collected real-time data inputs or external data. Additionally, the driving score may be validated by verifying the calculation of the driving score and the output, i.e. value of the driving score. In at least one embodiment, the validating agency may be an insurance company. The validating agency may standardize the driving scores and/or rules and algorithms for calculating the driving score and may provide the driving scores to other agencies or entities. The validating agency may charge a requesting agency or entity for receiving driving scores. The requesting agencies or entities may be charged on a usage basis or subscription basis.

The telematics device 101 may include an alert device that provides an audible or visual alert. For example, the telematics device 101 may send a text or SMS message to a mobile phone or may send email to a driver to give the driver feedback about the driving. The alert may be sent at any time. For example, the alert may be sent in real-time, e.g. at the time of an event. Alternatively, a driving report may be generated. The driving report may be sent to one or more third parties, such as the driver, an insurance agency, a credit agency, and/or a governmental agency. The driving report may be sent at any time. In one embodiment, the driving report is sent at a predetermined frequency, for example monthly or weekly. The audible alert may be a tone or a voice that beeps when a specific event happens, such as a driver exceeding a speed limit or a voice that instructs the driver that the vehicle is travelling above the speed limit. A driver may be alerted, in the driving report or through the audible or visual alert of his or her driving score, his or her driving habits, and/or the effect of the driver's habits. The effect of the habit may include any type of information, such as information relating to the damage to or wear upon a vehicle or the effect of the driver's habits on the driving score. For example, the driver may be alerted that frequent hard braking is negatively affecting his/her driving score and/or may cause excessive wear to the brake pads.

The driving score may be utilized in any suitable way. For example, a driving score may be used to rent a car. Generally, a driver must be over the age of 25 to rent a car. However, car rental agencies may use the driving score to remove the age requirement for renting a car. For example, a car rental agency may allow anyone with a driving score above a certain threshold to rent a car. Alternatively, or additionally, the driving score may be used by the car rental agencies to determine a rental rate or an insurance rate for a rental car.

The driving score may be used by employers that require an employee to drive a vehicle (e.g. a taxi, trucker, delivery person, etc.). The employer may submit a request for a driver's driving score to the entity that collects and/or verifies the driving score, such as an insurance agency.

The driving score may be used by government agencies, such as the department of motor vehicles (DMV). The DMV may use the driving score in lieu of a driver taking a driving test. In this embodiment, the DMV may require a driver to log a specific number of hours driving and/or reach a threshold driving score. If the DMV's requirements are reached, the DMV may issue a license or a probationary license to a driver. The DMV may also require a driver that has a license to maintain a driving score above a threshold to keep his/her license. The driving score may be checked periodically by the DMV to determine whether the driver's score is above the threshold limit. If the driver's score falls below a threshold limit, the driver's license may be revoked, the driver may receive a ticket, and/or or the driver may be required to attend driving classes or driving training.

The driving score may be used and accepted by all insurance companies. The insurance companies may use the driving score to determine an appropriate insurance policy or an appropriate rate for an insurance policy of a customer. In at least one embodiment, the driving score may be used by a customer to evaluate and select the best insurance policy from a plurality of insurance companies.

The driving score may be sent to credit agencies and used in establishing or altering a credit score. The driving score may also be used in credit card, mortgage, lease, loan, and/or school applications for individuals who have little to no credit. For example, the driving score may be used as a predictor for determining whether the applicant will fulfill his or her obligations. As described in U.S. Pat. No. 8,086, 523, which is incorporated by reference herein in its entirety, a user's credit score or may be generated by a statistical credit-scoring model, which is used to objectively evaluate information that pertains to making a credit or credit-related decision. The statistical model may consider conventional credit risk information (e.g., a user's FICO score, payment history, length of credit history, amount owed, types of credit used, new credit, etc.) as well as a driving score to calculate credit score.

The driving score may be used to prevent individuals from driving in certain areas or drivers may be charged for entering certain areas. Additionally, the driving score may be used by an agency, such as a governmental agency, to tax a driver. The tax may relate to gas taxes, taxes for using a certain road, and/or taxes for driving at a certain time or using a certain road at a specific time.

Figure 3:
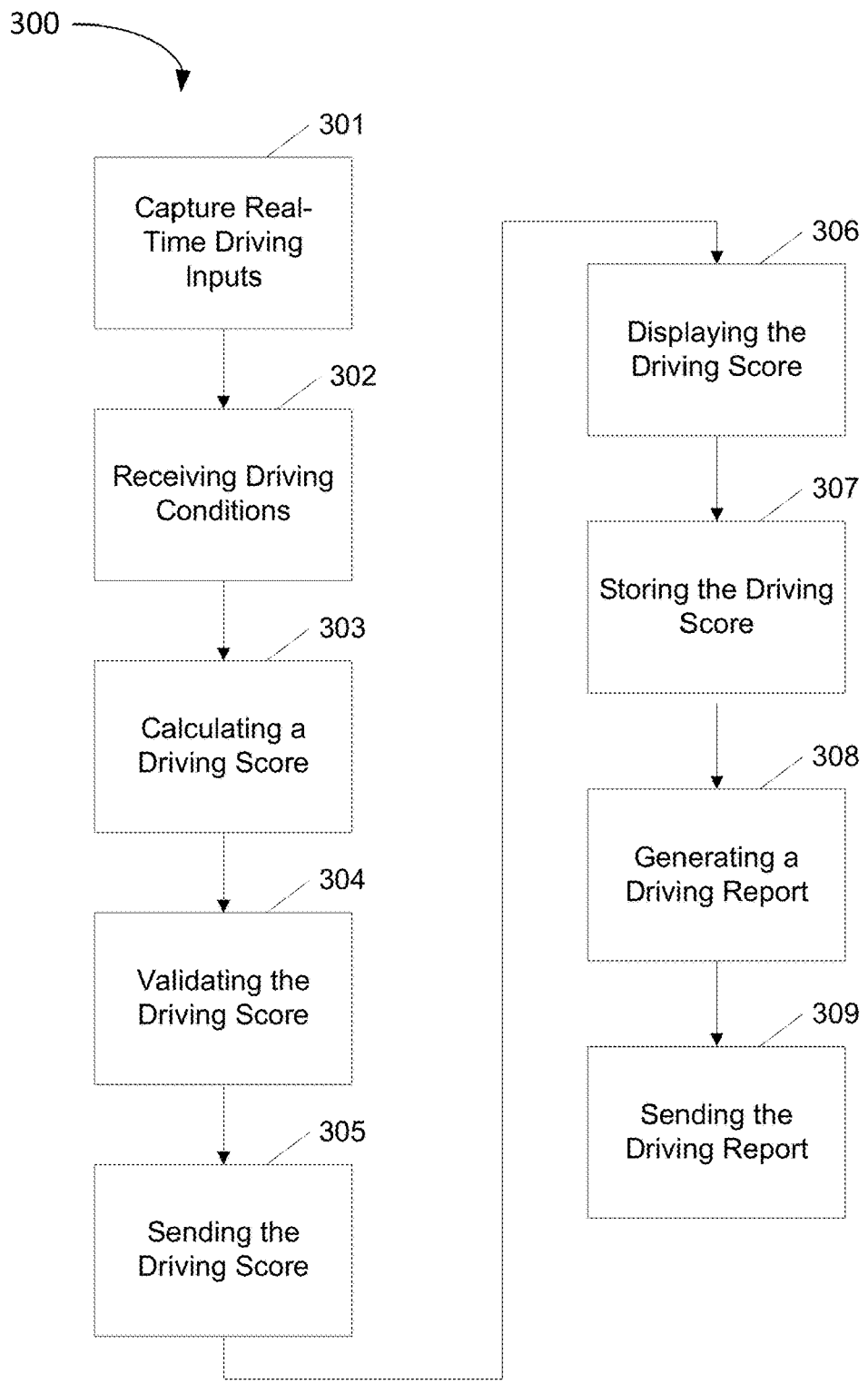
FIG. 3 illustrates a method for calculating and utilizing a driving score in accordance with certain aspects of the disclosure.

The steps that follow may be implemented by one or more of the components in FIGS. 1 and 2 and/or other components, including other computing devices. FIG. 3 illustrates a method 300 of calculating and utilizing a driving score according to one or more aspects of the invention. As illustrated in step 301, a telematics device 101 captures real-time driving inputs for one or more drivers, as discussed in detail above. In step 302, external or driving conditions may be captured or received, as discussed above. The external or driving conditions may be provided by a third party, may be determined from databases or files, and/or may be captured by the telematics device 101.

In step 303, the computing device 201 calculates or generates a driving score for one or more drivers, as discussed in detail above. The driving score may be based at least in part on the real-time driving inputs and the external or driving conditions captured and/or received in steps 301 and 302. In step 304, the calculated driving score may be validated. The driving score may be validated by a validating entity or by the entity that oversees the calculation/generation of the driving score. The driving score may be validated by verifying the inputs and outputs of the calculation. The driving score may be any numerical, alphabetical, or graphical value.

In step 305, the driving score may be sent to an individual and/or an entity. For example, the driving score may be sent to a computing device, an input/output device 202, such as a portable device, the driver, or an insurance or governmental agency. The driving score may also be displayed, as illustrated in step 306. The driving score may be displayed on any type of device. For example, the driving score may be displayed on a computing device, mobile telephone, key fob, or may be displayed on items within the vehicle, such as the windshield or rearview mirror. As illustrated in step 307, the driving score may be stored. The driving score may be stored on any type of device including memory. For example, the computing device 201 and/or input/output devices 202 may store in the driving score. In at least one embodiment, the driving score is stored in the non-volatile memory of a key fob for a vehicle.

The computing device 201 may generate a driving report for one or more drivers, as illustrated in step 308. The driving report may contain any type of information. For example, the driving report may contain the driver's name, the vehicle(s) driven, the driving score, the driving habits of a driver, and/or the effect of the driver's driving habits on the vehicle. Additionally or alternatively, the driving report may contain information regarding the calculation of the driving score and or the potential changes to the driving score based on the information within the driving report. As an example, the driving report may contain information such as the name and an identifier of the driver, such as a driver's license number, the vehicle description, the driver's habits, such as excessive braking and routine speeding, and the effects of the excessive braking to the vehicle and the potential decrease to a driver's score because of the excessive braking and routine speeding. As illustrated in step 309, the driving report may be sent to individuals or entities. For example the driving report may be sent to the driver or may be sent to an insurance agency or credit agency, as discussed above.

Aspects of the disclosure have been described in terms of illustrative embodiments thereof. Numerous other embodiments, modifications and variations will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Additionally, those skilled in the art will appreciate that there are numerous variations and permutations of the above-described systems and techniques that fall within the spirit and scope of the invention as set forth in the appended claims.

What is claimed is:

1. An apparatus comprising:
   one or more processors; and memory storing instructions that, when executed by the one or more processors, cause the apparatus to:
receive, from a telematics device, using a first network connection with the telematics device:
an indication of a vehicle; and
trip data comprising a type of a trip taken by the vehicle and a number of miles driven during the trip;
determine, based on comparing the indication of the vehicle with a plurality of available vehicles, an identity of the vehicle;
generate a driving score for the vehicle based, at least in part, on the identity of the vehicle, the type of the trip, and the number of miles driven during the trip; and
provide the driving score, wherein providing the driving score comprises:
sending, to a computing device associated with a driver of the vehicle and using a second network connection, the driving score;
sending, using a third network connection, the driving score to a validation agency;
receiving a validation of the driving score from the validation agency; and
sending the driving score to at least one device associated with an entity different than the driver of the vehicle.

2. The apparatus of claim 1, wherein the telematics device provides a notification of the driving score comprising at least one of: an audible alert, or a visual alert.

3. The apparatus of claim 1, wherein the instructions, when executed by the one or more processors, cause the apparatus to generate the driving score further based on a number of passengers in the vehicle during the trip.

4. The apparatus of claim 1, wherein the instructions, when executed by the one or more processors, cause the apparatus to generate the driving score further based, at least in part, on a type of the vehicle.

5. The apparatus of claim 1, wherein the instructions, when executed by the one or more processors, cause the apparatus to generate the driving score further based on a duration of the trip.

6. The apparatus of claim 1, wherein the entity determines, based on the driving score, one or more of: an insurance policy, or an insurance rate.

7. The apparatus of claim 1, wherein the entity manages the plurality of available vehicles, and wherein the plurality of available vehicles comprises the vehicle.

8. The apparatus of claim 1, wherein the instructions, when executed by the one or more processors, further cause the apparatus to determine that the type of trip taken by the vehicle is an errand trip, a commute trip, or a new trip.

9. The apparatus of claim 1, wherein the first network connection and the second network connection are a same network connection.

10. The apparatus of claim 1, wherein:
the trip data further comprises data representing a driving action prevented by the vehicle; and
generating the driving score is based, at least in part, on the data representing the driving action prevented by the vehicle.

11. A method comprising:
receiving, by a first computing device and from a telematics device using a first network connection with the first computing device:
an indication of a vehicle; and
trip data comprising a type of a trip taken by the vehicle and a number of miles driven during the trip;
determining, by the first computing device, an identity of the vehicle based on comparing the indication of the vehicle with a plurality of available vehicles;
generating, by the first computing device, a driving score for the vehicle based, at least in part, on the identity of the vehicle, the type of the trip, and the number of miles driven during the trip; and
providing the driving score, wherein providing the driving score comprises:
sending, to a second computing device associated with a driver of the vehicle, the driving score;
sending, using a third network connection, the driving score to a validation agency;
receiving a validation of the driving score from the validation agency; and
sending the driving score to at least one device associated with an entity different than the driver of the vehicle.

12. The method of claim 11, wherein the telematics device provides a notification of the driving score comprising at least one of: an audible alert, or a visual alert.

13. The method of claim 11, wherein the generating the driving score further based, at least in part, on a type of the vehicle.

14. The method of claim 11, wherein the entity manages the plurality of available vehicles, and wherein the plurality of available vehicles comprises the vehicle.

15. A system comprising:
a telematics device comprising:
one or more first processors; and
first memory storing first instructions that, when executed by the one or more first processors, cause the telematics device to:
collect, via one or more sensors:
an indication of a vehicle; and
trip data comprising a type of a trip taken by the vehicle and a number of miles driven during the trip; and
a computing device comprising:
one or more second processors; and
second memory storing second instructions that, when executed by the one or more second processors, cause the computing device to:
receive, from the telematics device and using a first network connection, the indication of the vehicle and the trip data;
determine, based on comparing the indication of the vehicle with a plurality of available vehicles, an identity of the vehicle;
generate a driving score for the vehicle based, at least in part, on the identity of the vehicle, the type of the trip, and the number of miles driven during the trip; and
provide the driving score, wherein providing the driving score comprises:
sending, to a computing device associated with a driver of the vehicle and using a second network connection, the driving score;
sending, using a third network connection, the driving score to a validation agency;
receiving a validation of the driving score from the validation agency; and
sending the driving score to at least one device associated with an entity different than the driver of the vehicle.

16. The system of claim 15, wherein the first instructions, when executed by the one or more first processors, further cause the telematics device to provide a notification comprising at least one of: an audible alert, or a visual alert.

17. The system of claim 15, wherein the second instructions, when executed by the one or more second processors, cause the computing device to generate the driving score further based on a number of passengers in the vehicle during the trip.

18. The system of claim 15, wherein the second instructions, when executed by the one or more second processors, cause the computing device to generate the driving score further based, at least in part, on a type of the vehicle.

19. The system of claim 15, wherein the second instructions, when executed by the one or more second processors, cause the computing device to generate the driving score further based on a duration of the trip.

20. The system of claim 15, wherein the entity determines, based on the driving score, at least one of one or more of: an insurance policy, or an insurance rate.

* * * * *